March 2, 1971   H. WOLTER   3,566,635
STEERING WHEEL SPINDLE CLOSURE
Filed Aug. 14, 1969   2 Sheets-Sheet 1

INVENTOR.
Heinz Wolter
BY James R. Montague
Attorney

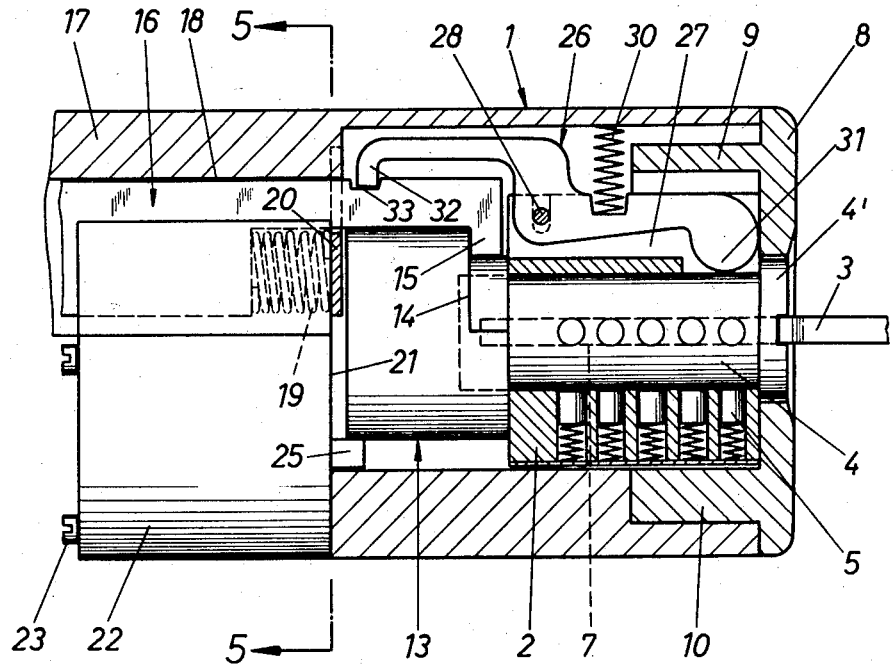
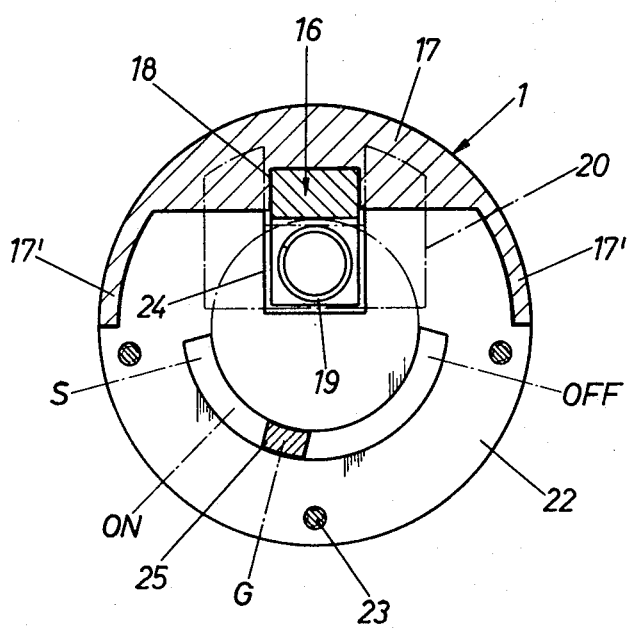

United States Patent Office 3,566,635
Patented Mar. 2, 1971

3,566,635
STEERING WHEEL SPINDLE CLOSURE
Heinz Wolter, Cologne-Lindenthal, Germany, assignor to
Josef Vose KG, Cologne, Germany
Filed Aug. 14, 1969, Ser. No. 850,053
Claims priority, application Germany, Aug. 17, 1968,
P 17 80 228.7
Int. Cl. E05b 65/12; B60r 25/02
U.S. Cl. 70—252
5 Claims

ABSTRACT OF THE DISCLOSURE

A steering wheel spindle lock equipped with a lock cylinder and a key operated switch, particularly for automotive vehicles, which comprises a cartridge-shaped housing and a lock cylinder. A locking bolt is displaceable in axial direction of the housing and both, the lock cylinder and the locking bolt, are disposed in the housing. The latter has a rearward projection of segment-shape in cross-section and a guide groove for the locking bolt. A switching housing is likewise a segment-shape in cross-section, and the switching housing and the rearward projection complement each other to a cartridge shape.

---

Figure 1:
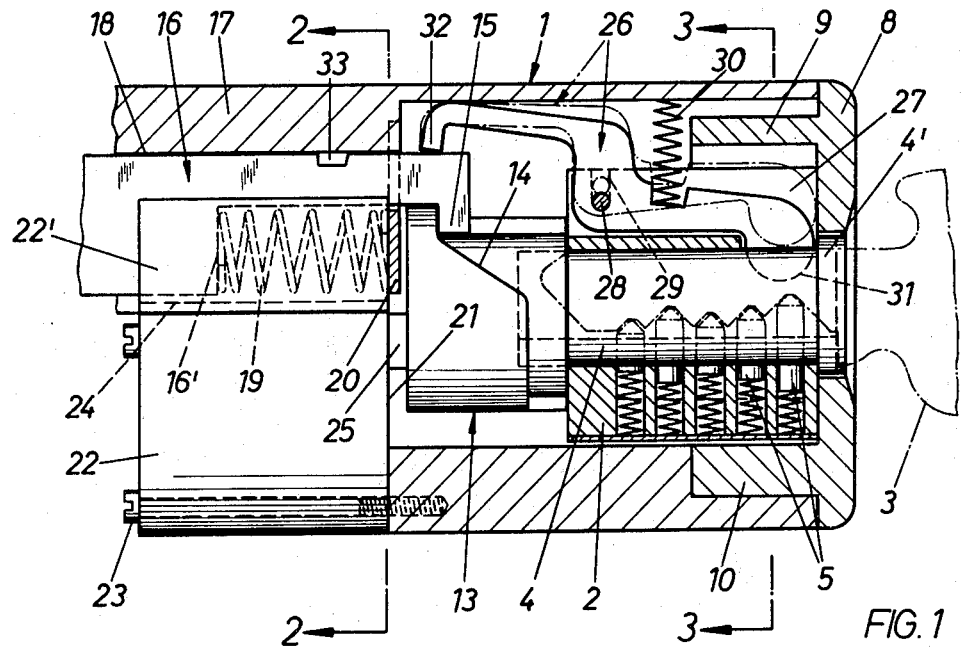

The present invention relates to a steering wheel spindle lock, particularly for automotive vehicles, equipped with a lock cylinder and a key-operated switch, with a cartridge-shaped housing, in which the lock cylinder is disposed and in which the lock cylinder, displaceable in axial direction of the housing is guided.

It is one object of the present invention to provide a steering wheel spindle lock in most favorable manner concerning the manufacturing technique such, that first of all a simplified mounting and a space-saving structure is brought about.

It is another object of the present invention to provide a steering wheel spindle lock, wherein the housing has a rearwardly disposed projection which is of segment shape in having a segment shape in cross-section with a guiding groove for the locking bolt and the switching housing which is likewise of segment shape design in cross-section, complements jointly with the projection to the cartridge shape.

It is still another object of the present invention to provide a steering wheel spindle lock, wherein the switching housing extending beyond the central axis of the steering wheel housing covers up with a longitudinal groove the locking bolt and the locking bolt spring disposed in a recess of the locking bolt.

It is yet another object of the present invention to provide a steering wheel spindle lock, wherein the switching housing is set off step-wise at the side faces and is laterally gripped by wings of the projection.

It is also an advantage in accordance with the present invention that the controlled cam for the lock bolt, sitting on the cylinder core has a controlled projection extending into a switching housing.

Further, it is also in accordance with the present invention of advantage, that below the bottom of the switching housing a U-shaped supporting sheet is disposed for one end of the locking bolt spring.

Due to such structure a simple formation as to its manufacturing and its mounting is created with the present steering wheel spindle lock with the result of a concentrated structure. The rearwardly disposed portion of the housing, which is of segment shape in cross-section, complements itself with the likewise segment-shaped switching housing in an advantageous manner to the cartridge shape. This brings about the advantage that the lock and the ignition switch can be jointly coordinated, as a prefabricated structure part, for fast mounting to a steering column. The segment-shaped projection forms in addition also the guide groove for the axially displaceable locking bolt. The longitudinal groove of the switching housing extending beyond the steering spindle axis serves favorably likewise for the guiding and covering of the locking bolt and of the locking bolt spring disposed in the recess of the locking bolt. A safe non-objectionally position, as well as a simplified building in of the switch into the housing is given due to the step-wise set side faces, which are gripped laterally by the wings of the projection centering the switching housing. The rotation of the cylinder core operated by the key is transmitted by means of the control can siting on the cylinder core and by the control projection disposed thereon to the ignition switch. In order not to support the locking bolt spring on the control cam and thereby effectively retardingly a rotation of the cylinder core, the present invention provides a U-shaped supporting sheet, disposed below the bottom of the switching housing, for the end of the locking bolt spring.

Figures 2, 3:
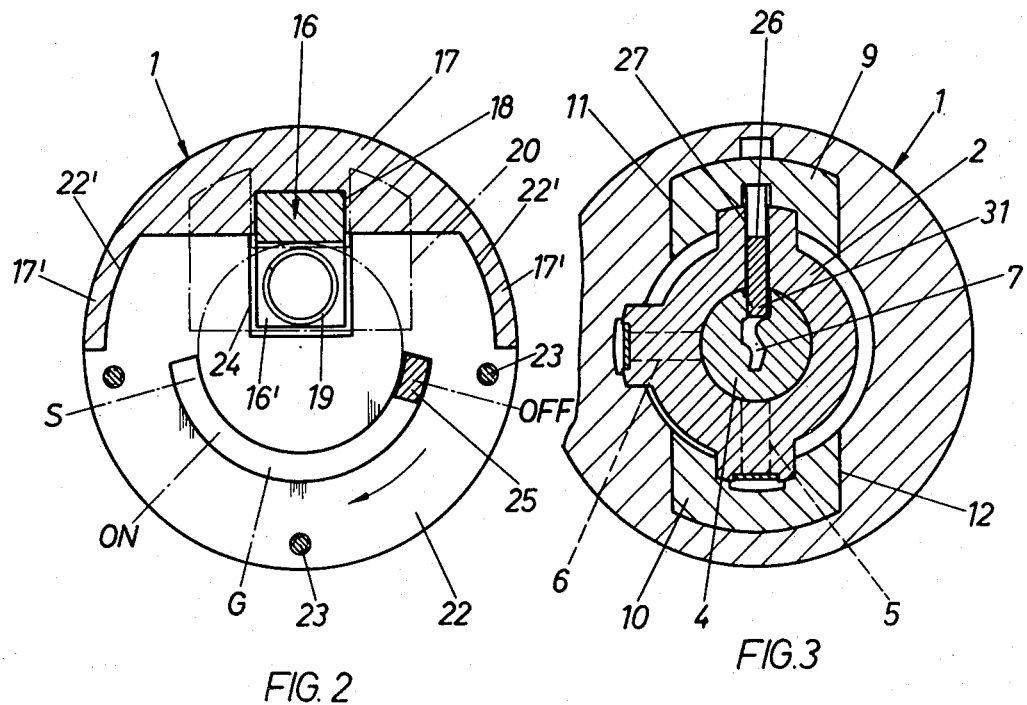

With these and other objects in view, which will become apparent in the following detailed description, which is shown by example only, the present invention will be clearly understood in connection with the accompanying drawings, in which:

FIG. 1 is a longitudinal section of a steering wheel spindle lock in locking position;
FIG. 2 is a section along the lines 2—2 of FIG. 1;
FIG. 3 is a section along the lines 3—3 of FIG. 1;
FIG. 4 is a longitudinal section of a lock disposed in the "GARAGE" position, and
FIG. 5 is a section along the lines 5—5 of FIG. 4.

Referring now to the drawings, a lock cylinder body 2 is axially inserted into the cartridge-shaped steering wheel spindle lock housing 1. This cylinder lock body 2 supports the cylinder core 4 turning by means of the key 3 into the positions "HOLD," "GARAGE," "START," "DRIVE," tumblers 5 and 6 being coordinated to the cylinder core 4. The cylinder core 4 has the key slot 7 and extends with its forward section 4' through the head plate 8, which enters in corresponding recesses 11 and 12 of the housing 1 with two oppositely disposed webs 9 and 10.

A control cam 13 is rigidly connected with the cylinder core 4 and has a control cam face 14. Into the control cam face 14 extends the hook-shaped end 15 of an axially displaceable locking bolt 16. This locking bolt 16 is mounted in the rearwardly disposed projection 17 of the housing 1, which is in cross-section of segment shape, in a guiding groove 18 and is under the effect of a spring 19, which is disposed in a recess 16' of the locking bolt 16. On the one hand the spring 19 abuts the locking bolt 16 and on the other hand a U-shaped supporting sheet 20 provided in the housing 1, which supporting sheet 20 is disposed directly below the bottom 21 of a switching housing 22.

The switching housing 22, likewise in cross-section of segment-shape, extends beyond the middle axis of the steering wheel spindle housing 1 and is secured in the rearward projection 17 of the housing 1 by means of screws 23. The switching housing 22 is step-wise set off and laterally gripped by wings 17' of the projection 17, so that the projection 17 and the switching housing 22 complement each other to a cartridge shape.

A longitudinal groove 24, disposed in the switching housing, serves for the guidance and coverage of the locking bolt 16 and of the locking bolt spring 19, disposed in the recess 16' of the locking bolt 16.

A control projection 25 of the control cam 13 penetrates into the switch housing 22, the switching roller (not shown) of which can be rotated in accordance with the locking positions of the cylinder core.

In the disclosed embodiment is provided a locking member 26, which enters the locking bolt 16 and is releasable by means of the key 3. This locking member 26 is swingably mounted in a longitudinal recess 27 of the locking cylinder housing 2 about a pin 28. This pin 28 guides itself in a groove 29 disposed crosswise to the longitudinal recess 27 of the locking cylinder housing 2. The locking member 26 is formed as a double-armed lever being under the effect of a spring 30. The locking member 26 extending over the entire length of the locking cylinder housing 2 enters with its forward end 31 in the key slot 7 of the cylinder core 4. The oppositely disposed end of the locking member 26 has a resting tooth 32 which, upon insertion of the key 3 and thereby the front end 31 is moved out of the key slot 7, during a return movement of the locking bolt 16 enters in a resting opening 33 provided on the locking bolt 16.

The lock operates in the following manner:

For the purpose of locking the key 3 is inserted into the key slot 7 of the cylinder core 4. The forward end 31 of the locking member 26 swings out of the key slot 7, so that the cylinder core 4 can be turned (see the point-dotted showing of the locking member 26 in FIG. 1). The control cam 13 displaces the locking bolt 16 due to its control cam face 14 such, that during the rotation of the cylinder core 4 from the position "HOLD" into the position "GARAGE" the locking bolt 16 is withdrawn so far, that the locking member 26 with its resting tooth 32 enters the opening 33 of the locking bolt 16 (see FIG. 4). During the rotation of the cylinder core 4 into the rotary position "DRIVE" and "START," the locking bolt 16 remains furthermore in operative position. The rotary positions of the cylinder core 4 are transmitted over the control projection 25 of the control cam 13 to the switch 22. the control lock 16 is freed only upon withdrawal of the key 3 from the position "HOLD," when the locking member 26 with its resting tooth 32 swings out from the resting opening 33 of the locking bolt 16, by entering the forward end 31 of the locking member 26 into the key slot 7.

While I have disclosed one embodiment of the present invention, it is to be understood that this embodiment is given by example only and not in a limiting sense.

I claim:

1. A steering wheel spindle lock equipped with a lock cylinder and a key operated switch, particularly for automotive vehicles, comprising
   a cartridge-shaped housing,
   a lock cylinder,
   a locking bolt displaceable in axial direction of said housing,
   both said lock cylinder and said locking bolt, being disposed in said housing,
   said housing having a rearward projection of segment-shape in cross-section and a guide groove for said locking bolt,
   a switching housing being likewise of segment-shape in cross-section, and
   said switching housing and said rearward projection complementing each other to a cartridge shape.

2. The steering wheel spindle lock, as set forth in claim 1, wherein
   said switch housing extends beyond the center axis of said steering wheel spindle housing and covers with a longitudinal groove said locking bolt and said locking bolt spring disposed in a recess of said locking bolt.

3. The steering wheel spindle lock, as set forth in claim 1, wherein
   said switching housing is stepwise set off at its side faces and is gripped laterally.

4. The steering wheel spindle lock, as set forth in claim 1, which includes
   a cylinder core disposed in said housing,
   a control cam for said locking bolt, sitting on said cylinder core and having a central projection, which extends into said switch housing.

5. The steering wheel spindle lock, as set forth in claim 2, which includes
   a U-shaped support sheet for one of said locking bolt spring, and
   said support sheet is disposed below the bottom of said switch housing.

References Cited
UNITED STATES PATENTS

| | | | |
|---|---|---|---|
| 1,699,399 | 1/1929 | Lach | 70—252 |
| 2,199,226 | 4/1940 | Lowe | 70—252 |

MARVIN A. CHAMPION, Primary Examiner

A. G. CRAIG, JR., Assistant Examiner